(12) United States Patent
Hong

(10) Patent No.: US 12,135,860 B2
(45) Date of Patent: *Nov. 5, 2024

(54) METHOD, SYSTEM, AND NON-TRANSITORY COMPUTER READABLE RECORD MEDIUM FOR PROVIDING CHATROOM IN 3D FORM

(71) Applicant: LINE Plus Corporation, Seongnam-si (KR)

(72) Inventor: SeokJu Hong, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 56 days.

This patent is subject to a terminal disclaimer.

(21) Appl. No.: 17/837,209

(22) Filed: Jun. 10, 2022

(65) Prior Publication Data

US 2022/0300144 A1 Sep. 22, 2022

Related U.S. Application Data

(63) Continuation of application No. 16/939,190, filed on Jul. 27, 2020, now Pat. No. 11,392,262, which is a
(Continued)

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/013* (2013.01); *G06F 3/017* (2013.01);
(Continued)

(58) Field of Classification Search
CPC ...... G06F 3/04815; G06F 3/013; G06F 3/017; G06F 3/04845; H04L 51/04; H04L 51/20
See application file for complete search history.

(56) References Cited

U.S. PATENT DOCUMENTS 6,559,863 B1 * 5/2003 Megiddo .................. H04N 7/15
348/E7.083
6,753,857 B1 * 6/2004 Matsuura ................ G06T 17/00
345/419
(Continued)

FOREIGN PATENT DOCUMENTS

JP 2001-160022 A 6/2001
JP 2013-175929 A 9/2013
(Continued)

OTHER PUBLICATIONS

Korean Office Action dated Sep. 19, 2022 issued in Korean Patent Application No. 10-2020-7013954.
(Continued)

*Primary Examiner* — Ryan F Pitaro
(74) *Attorney, Agent, or Firm* — Harness, Dickey & Pierce, P.L.C.

(57) ABSTRACT

Disclosed are methods, systems, and non-transitory computer-readable record mediums for providing a chatroom in a three-dimensional (3D) form. A chatroom display method including recognizing a screen switch event for a chatroom displayed on the electronic device, switching a screen to display the chatroom in a form of a 3D space in response to the screen switch event, and representing a distance between a user of the electronic device and a chat partner included in the chatroom as depth information of the 3D space based on location information of the electronic device and location information of at least one chat partner may be provided.

15 Claims, 13 Drawing Sheets

Related U.S. Application Data continuation of application No. PCT/KR2018/001702, filed on Feb. 8, 2018.

(51) Int. Cl.
- G06F 3/04845 (2022.01)
- G06F 3/04883 (2022.01)
- H04L 51/04 (2022.01)
- H04L 51/222 (2022.01)

(52) U.S. Cl.
CPC ...... *G06F 3/04845* (2013.01); *G06F 3/04883* (2013.01); *H04L 51/04* (2013.01); *H04L 51/222* (2022.05)

(56) References Cited

U.S. PATENT DOCUMENTS

| | | | | |
|---|---|---|---|---|
| 6,772,195 | B1* | 8/2004 | Hatlelid | G06F 3/04815 709/224 |
| 7,124,372 | B2* | 10/2006 | Brin | H04L 12/1822 715/757 |
| 7,386,799 | B1* | 6/2008 | Clanton | A63F 13/12 715/861 |
| 9,224,290 | B1* | 12/2015 | Mason | G08C 23/04 |
| 9,645,221 | B1* | 5/2017 | Heizer | G06Q 30/0255 |
| 9,813,364 | B2* | 11/2017 | Choi | H04L 51/046 |
| 10,171,598 | B2* | 1/2019 | Chen | H04W 12/086 |
| 10,305,850 | B1* | 5/2019 | Aziz | G06Q 50/01 |
| 10,541,826 | B2* | 1/2020 | Chi | G06Q 50/01 |
| 10,656,797 | B1* | 5/2020 | Alvi | G06F 3/04817 |
| 10,771,742 | B1* | 9/2020 | Pance | G06F 3/167 |
| 11,144,959 | B2* | 10/2021 | Liu | G06Q 30/0251 |
| 11,632,345 | B1* | 4/2023 | Taylor | H04L 51/216 455/412.2 |
| 2005/0060377 | A1* | 3/2005 | Lo | H04L 51/04 709/206 |
| 2005/0086605 | A1* | 4/2005 | Ferrer | G06Q 30/02 715/706 |
| 2006/0240774 | A1* | 10/2006 | Blom | H04W 8/005 455/12.1 |
| 2007/0266096 | A1* | 11/2007 | Daly | H04L 12/1818 709/204 |
| 2008/0086261 | A1* | 4/2008 | Robinson | A63F 13/12 707/999.005 |
| 2009/0265642 | A1* | 10/2009 | Carter | G06F 3/011 715/757 |
| 2010/0203904 | A1* | 8/2010 | Khokhlov | G06F 3/0481 455/457 |
| 2011/0069643 | A1* | 3/2011 | Yoakum | H04L 65/4015 370/261 |
| 2012/0020238 | A1* | 1/2012 | Suetsugu | H04L 67/52 370/252 |
| 2012/0110479 | A1* | 5/2012 | Fujisawa | A63F 13/537 715/758 |
| 2013/0055112 | A1* | 2/2013 | Joseph | H04L 12/1827 715/758 |
| 2013/0331130 | A1* | 12/2013 | Lee | A61K 31/196 455/457 |
| 2014/0115059 | A1* | 4/2014 | Van Wie | G06Q 30/0613 709/204 |
| 2014/0181698 | A1* | 6/2014 | Choi | H04L 51/222 715/758 |
| 2014/0207884 | A1* | 7/2014 | Malik | H04L 67/54 709/206 |
| 2015/0046807 | A1* | 2/2015 | Yerli | G06Q 50/01 715/716 |
| 2015/0120851 | A1* | 4/2015 | Kimura | H04L 51/52 709/206 |
| 2015/0319203 | A1* | 11/2015 | Jeremias | G06F 3/0484 715/753 |
| 2015/0341472 | A1* | 11/2015 | Yanofski | H04L 67/02 709/203 |
| 2016/0182613 | A1* | 6/2016 | Brune | H04L 67/10 709/217 |
| 2016/0192315 | A1* | 6/2016 | Paek | H04W 4/029 455/456.1 |
| 2016/0196596 | A1* | 7/2016 | Van Wie | H04L 12/1813 705/26.41 |
| 2016/0295384 | A1* | 10/2016 | Shan | H04W 4/08 |
| 2016/0308798 | A1* | 10/2016 | Magistrado | G06F 3/04842 |
| 2017/0019357 | A1* | 1/2017 | Lee | H04W 4/21 |
| 2017/0024108 | A1* | 1/2017 | Suzuki | H04L 51/10 |
| 2017/0282062 | A1* | 10/2017 | Black | A63F 13/25 |
| 2017/0285885 | A1* | 10/2017 | Henderson | H04L 51/04 |
| 2017/0289074 | A1* | 10/2017 | Joo | H04L 67/52 |
| 2017/0323266 | A1* | 11/2017 | Seo | H04L 51/04 |
| 2018/0006976 | A1* | 1/2018 | Ye | H04L 51/04 |
| 2018/0006993 | A1* | 1/2018 | Jazayeri | G06Q 10/107 |
| 2018/0039341 | A1* | 2/2018 | Du Bois | G06F 3/017 |
| 2018/0341387 | A1* | 11/2018 | Segal | H04L 51/04 |
| 2019/0265945 | A1* | 8/2019 | Newell | G06Q 30/02 |
| 2019/0282903 | A1* | 9/2019 | Brody | A63F 13/216 |
| 2020/0077483 | A1* | 3/2020 | Agarwal | H05B 47/19 |
| 2020/0111264 | A1* | 4/2020 | Kuruvilla | G06T 19/20 |
| 2020/0244809 | A1* | 7/2020 | Koh | H04M 1/72454 |
| 2020/0366509 | A1* | 11/2020 | Jung | H04W 4/21 |
| 2021/0200426 | A1* | 7/2021 | Al Majid | G06F 3/0482 |
| 2021/0279953 | A1* | 9/2021 | Bouhnik | G06T 17/05 |

FOREIGN PATENT DOCUMENTS

| | | |
|---|---|---|
| JP | 2017-004297 A | 1/2017 |
| JP | 2017-527917 A | 9/2017 |
| KR | 10-2002-0074304 A | 9/2002 |
| KR | 10-2011-0072438 A | 6/2011 |
| KR | 10-2012-0074669 A | 7/2012 |
| KR | 10-2013-0063324 A | 6/2013 |
| KR | 10-2013-0094380 A | 8/2013 |
| KR | 10-2014-0032634 A | 3/2014 |
| KR | 10-2014-0052794 A | 5/2014 |
| KR | 10-2014-0108436 A | 9/2014 |
| KR | 10-2015-0105719 A | 9/2015 |
| KR | 10-2015-0128482 A | 11/2015 |
| KR | 10-2015-0132526 A | 11/2015 |
| KR | 10-2016-0041879 A | 4/2016 |
| KR | 10-2017-0030421 A | 3/2017 |
| KR | 10-2017-0111810 A | 10/2017 |
| WO | WO-2016/002331 A1 | 1/2016 |

OTHER PUBLICATIONS

International Search Report dated Nov. 6, 2018 issued in International Application No. PCT/KR2018/001702.

Japanese Office Action dated Dec. 7, 2021 issued in corresponding Japanese Patent Application No. 2020-542728.

* cited by examiner

METHOD, SYSTEM, AND NON-TRANSITORY COMPUTER READABLE RECORD MEDIUM FOR PROVIDING CHATROOM IN 3D FORM

CROSS-REFERENCE TO RELATED APPLICATIONS

This U.S. non-provisional application is a continuation of U.S. application Ser. No. 16/939,190, filed on Jul. 27, 2020, which is a continuation application of, and claims the benefit of priority under 35 U.S.C. § 365(c) from International Application PCT/KR2018/001702, which has an International filing date of Feb. 8, 2018, the disclosure of each of which is incorporated herein by reference in its entirety.

BACKGROUND

Technical Field

One or more example embodiments relate to techniques for displaying a chatroom.

Related Art

An instant messenger, which is a general communication tool, refers to software capable of sending and receiving messages or data in real time. A user may register a chat partner on a messenger and may exchange messages with a partner included in a chat partner list in real time.

Such a messenger function is popular in a mobile environment of a mobile communication terminal as well as a personal computer (PC).

SUMMARY

Some example embodiments may represent a chatroom as a depth-adjustable three-dimensional (3D) mode using 3D technology.

Some example embodiments may represent a distance from a chat partner as depth information on a 3D space.

Some example embodiments may represent state information associated with a chat partner on a 3D space.

Some example embodiments may track a gaze of a user for a chatroom and output state information of a chat partner corresponding to the gaze of the user.

According to at least one example embodiment, a chatroom display method implemented by an electronic device comprising at least one processor configured to execute computer-readable instructions included in a memory includes by at least one processor, recognizing, by the at least one processor, a screen switch event for a chatroom displayed on the electronic device, switching, by the at least one processor, a screen to display the chatroom in a form of a three-dimensional (3D) space in response to the screen switch event, and representing, by the at least one processor, a distance between a user of the electronic device and a chat partner included in the chatroom as depth information of the 3D space based on location information of the electronic device and location information of the chat partner.

The recognizing may comprise receiving an input gesture from the user, and recognizing the received input gesture as the screen switch event.

The recognizing may comprise recognizing the screen switch event for the chatroom based on time information or location information set for the chatroom.

The recognizing may comprise recognizing the screen switch event for the chatroom based on the location information of the electronic device and the location information of the chat partner included in the chatroom.

The switching may comprise changing and displaying the chatroom as the 3D space having depth information in response to the screen switch event; and adjusting a depth of the 3D space in response to a desired gesture with respect to the 3D space.

The representing may comprise representing a distance between the user and the chat partner as depth information between a user icon representing the user and a partner icon representing the chat partner on the 3D space.

The representing may comprise classifying a moving type of the chat partner based on at least one of a moving speed or a moving route according to the location information of the chat partner, and displaying a moving state icon corresponding to the moving type at a location adjacent to the partner icon.

The representing may comprise displaying a new message at a location adjacent to the partner icon during a desired period of time in response to receiving the new message from the chat partner.

The representing may comprise displaying an identifier indicating a non-confirmed message at a location adjacent to the partner icon in response to a new message received from the chat partner being not processed for a desired period of time as the non-confirmed message.

The representing may comprise displaying an icon representing another service being used by the chat partner at a location adjacent to the partner icon.

The representing may comprise tracking a gaze of the user with respect to the 3D space and outputting content being used by the chat partner corresponding to the gaze of the user through an output device of the electronic device.

According to an aspect of at least one example embodiment, there is provided a non-transitory computer-readable record medium storing instructions that, when executed by the at least one processor, cause the at least one processor to perform the aforementioned chatroom display method.

According to an aspect of at least one example embodiment, a chatroom display system configured as an electronic device includes a memory and at least one processor configured to execute computer-readable instructions included in the memory. The at least one processor is configured to recognize a screen switch event for a chatroom displayed on the electronic device, switch a screen to display the chatroom in a form of a three-dimensional (3D) space in response to the screen switch event, output state information associated with at least one chat partner included in the chatroom on the 3D space, and represent a distance between a user of the electronic device and a corresponding chat partner as depth information on the 3D space based on location information of the electronic device and location information of the corresponding chat partner.

DETAILED DESCRIPTION

Figure 1:
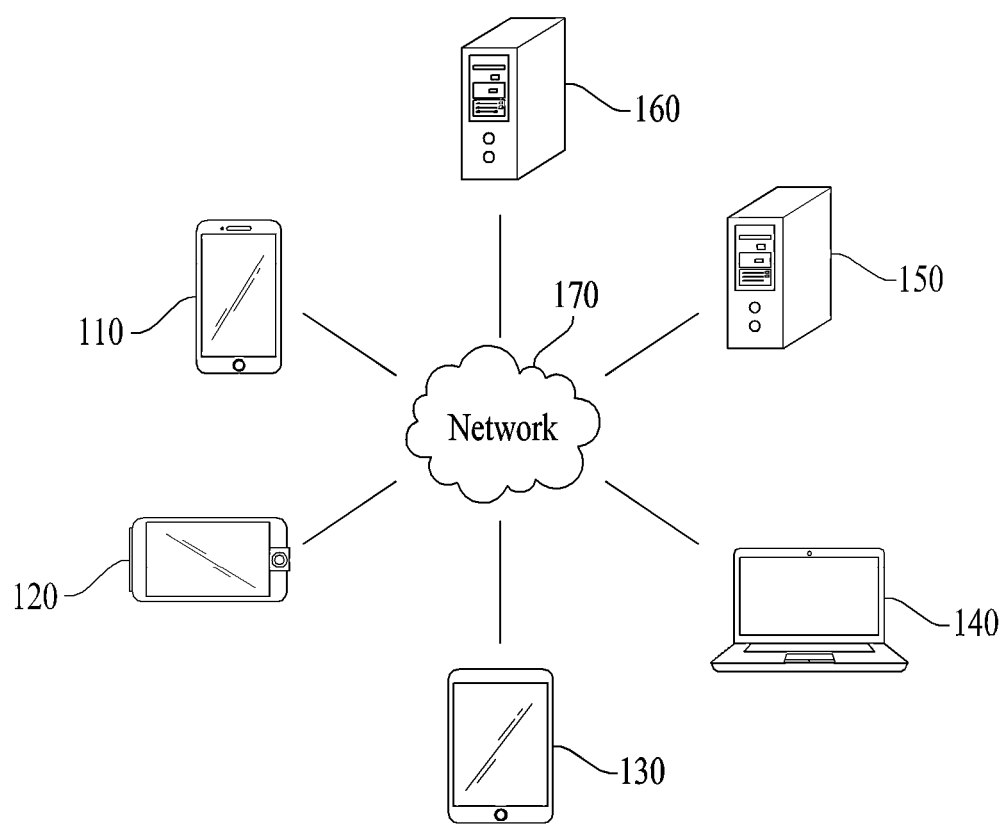
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Some example embodiments relate to technologies for representing a chatroom that is a chat interface screen, and more particularly, to technologies for representing a chatroom as a depth-adjustable three-dimensional (3D) mode.

Some example embodiments including disclosures herein may represent a chatroom as a depth-adjustable 3D mode, and accordingly, may achieve many advantages in terms of intuitiveness, efficiency, expandability, and convenience.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170 and the server 160 may be a system that provides a second service to the plurality of electronic devices 110, 120, 130, and 140 connected over the network 170. In detail, the server 150 may provide, as the first service, a service, for example, a messenger service, intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
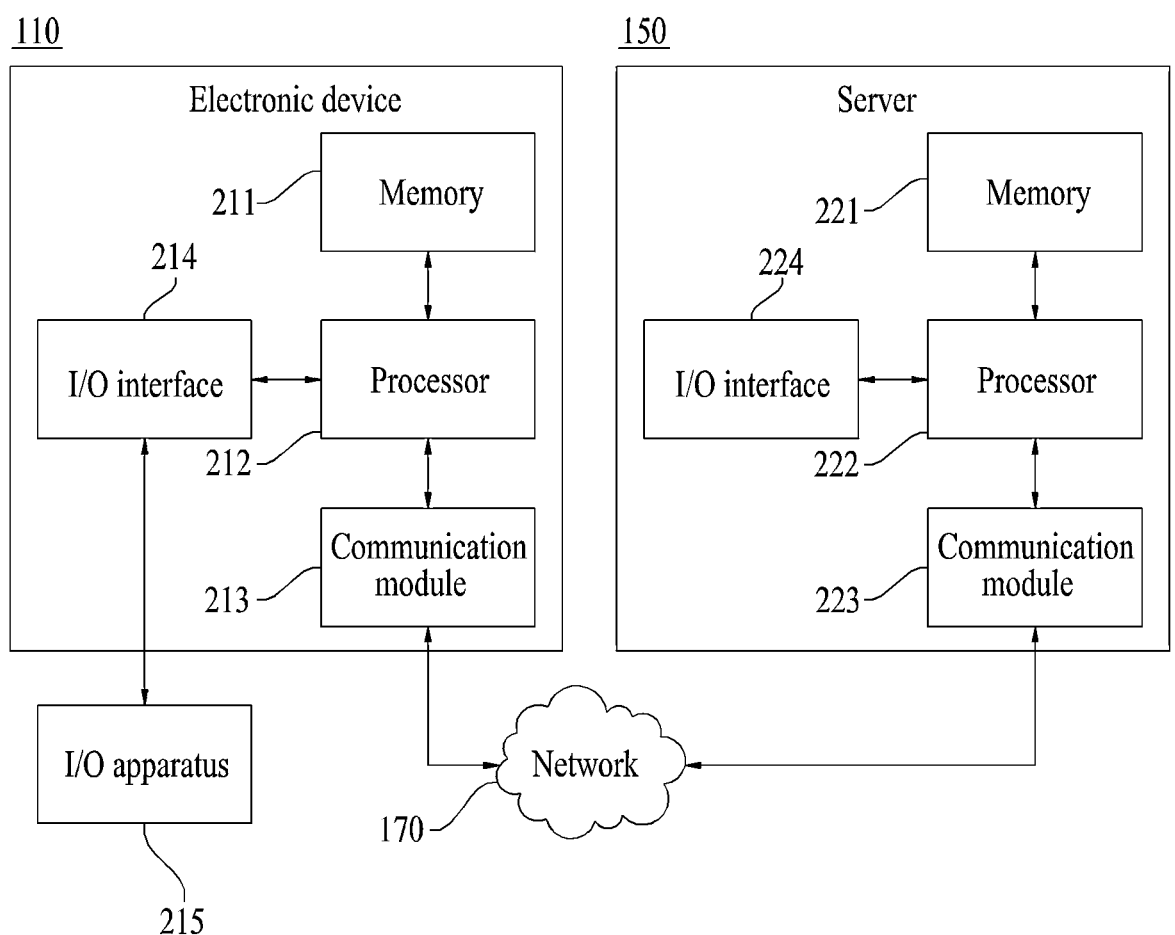
FIG. 2 is a diagram illustrating an example of an electronic device and a server according to at least one example embodiment.

FIG. 2 is a diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the electronic device 110 or the server 150 as a permanent storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 with another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to other example embodiments, the electronic device 110 and the server 150 may include a smaller or greater number of components than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, a method and system for representing a chatroom in a 3D form according to example embodiments is described.

Figure 3:
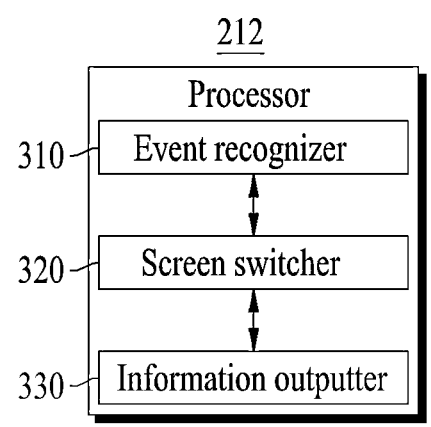
FIG. 3 is a diagram illustrating an example of components includable in a processor of an electronic device according to at least one example embodiment.
Figure 4:
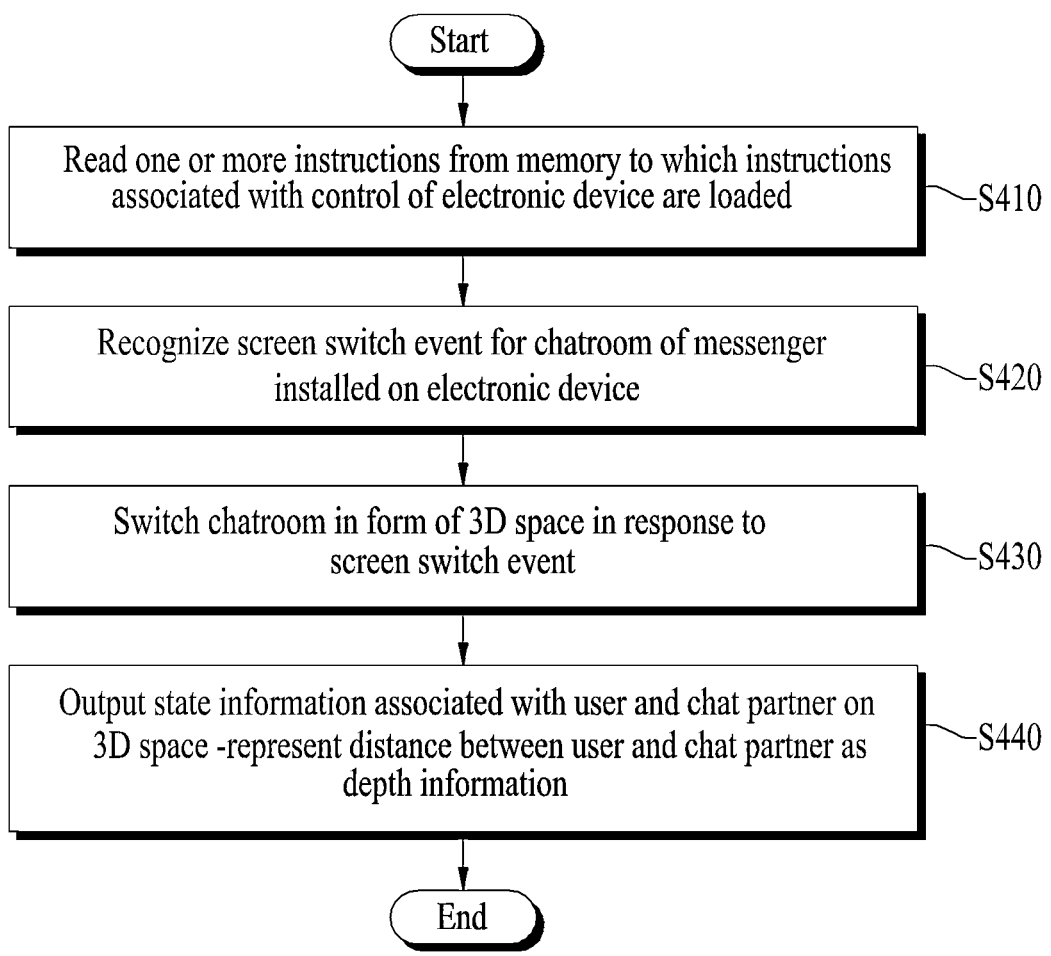
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A chatroom display system implemented using a computer may be configured in the electronic device 110 according to the example embodiment. For example, the chatroom display system may be configured in a form of a program that independently operates or may be configured in an in-app form of a specific application to be operable on the specific application and may provide a messenger service through interaction with the server 150 depending on example embodiments.

The chatroom display system configured in the electronic device 110 may perform a chatroom display method in response to an instruction provided from an application installed on the electronic device 110. Referring to FIG. 3, to perform the chatroom display method of FIG. 4, the processor 212 of the electronic device 110 may include an event recognizer 310, a screen switcher 320, and an information outputter 330 as components of the processor 212. Depending on some example embodiments, components of the processor 212 may be selectively included in or excluded from the processor 212. Also, depending on some example embodiments, the components of the processor 212 may be separated or merged for representation of functions of the processor 212.

The processor 212 (e.g., the components of the processor 212) may control the electronic device 110 to perform operations S410 to S440 included in the chatroom display method of FIG. 4. For example, the processor 212 (e.g., the components of the processor 212) may be configured to execute an instruction according to a code of at least one program and a code of an OS included in the memory 211.

Here, the components of the processor 212 may be representations of different functions of the processor 212 performed by the processor 212 in response to an instruction provided from a program code stored on the electronic device 110, for example, an instruction provided from an application executed on the electronic device 110. For example, the event recognizer 310 may be used as a functional representation of the processor 212 that controls the electronic device 110 to recognize a screen switch event for a chatroom in response to the aforementioned instruction.

Referring to FIG. 4, in operation S410, the processor 212 may read one or more instructions from the memory 211 to which instructions associated with control of the electronic device 110 are loaded. In this case, the read instruction may include an instruction for controlling the processor 212 to perform the following operations S420 to S440.

In operation S420, the event recognizer 310 may recognize a screen switch event for a chatroom that is a chat interface screen of a messenger installed on the electronic device 110. The chatroom, as an interface screen corresponding to a communication session established between an account of the user of the electronic device 110 and an account of at least one chat partner, may be configured and displayed generally as a screen of a two-dimensional (2D) form. For example, in response to a user's input of a desired or (alternatively, preset) gesture to the chatroom, for example, a 3D touch (e.g., a touch pressure) on a screen of the electronic device 110, the event recognizer 310 may recognize the input gesture as a screen switch event. As another example, in response to a direct selection from the user on a screen switch menu included in the chatroom, linkage to a chat partner list, or linkage a profile, using a touch, the event recognizer 310 may recognize the same as a screen switch event. As another example, the event recognizer 310 may automatically recognize a screen switch event for a corresponding chatroom based on time information set for the chatroom. For example, the event recognizer 310 may recognize a point in time corresponding to 30 minutes before an appointment time set for a chatroom as a screen switch event. As another example, the event recognizer 310 may automatically recognize a screen switch event for a corresponding chatroom based on location information set for the chatroom. For example, if a location of the electronic device 110 arrives at an appointment place set for a chatroom, the event recognizer 310 may recognize the same as a screen switch event. As another example, the event recognizer 310 may recognize a screen switch event for a corresponding chatroom based on a location distribution according to location information of the electronic device 110 and location information of chat partners included in the chatroom. For example, if users included in a chatroom are scattered by a desired (or alternatively, predetermined) desired level or more, the event recognizer 310 may recognize the same as a screen switch event. As another example, if a video call, for example, a Voice over Internet Protocol (VoIP) call starts between users of a chatroom, the event recognizer 310 may automatically recognize a screen switch event for the chatroom.

Figure 5:
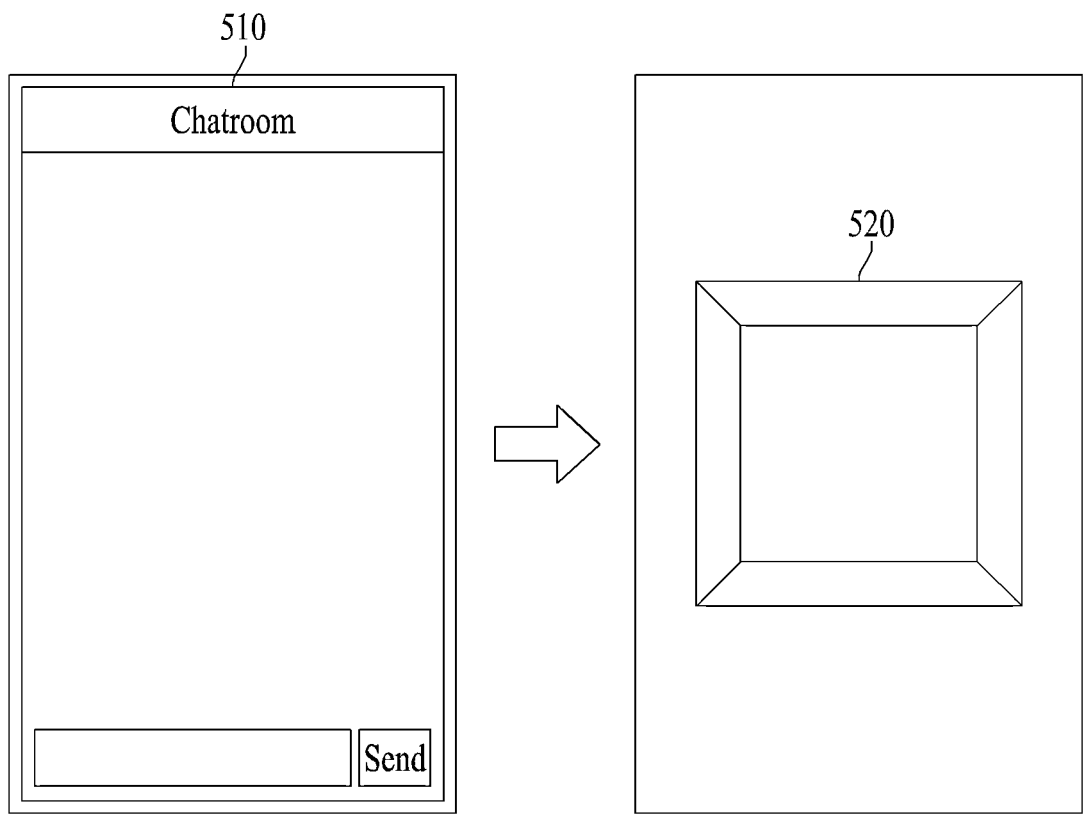
FIGS. 5 and 6 illustrate examples of a process of displaying a chatroom in a three-dimensional (3D) form according to at least one example embodiment.
Figure 6:
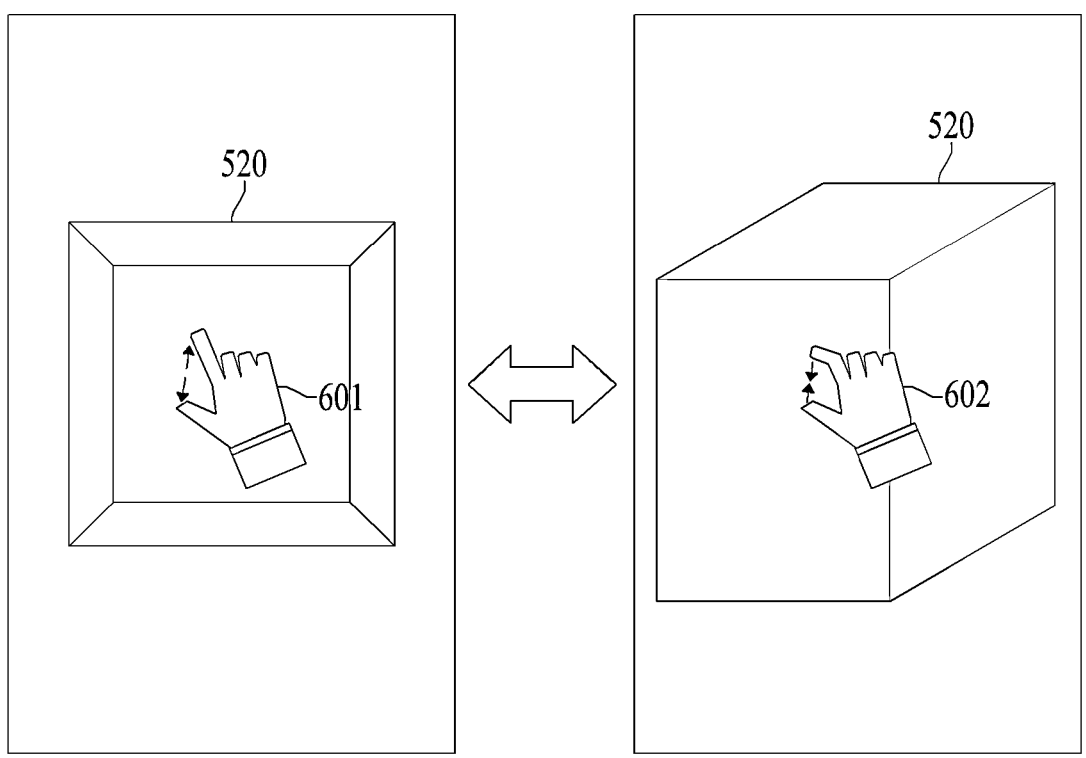

In operation S430, the screen switcher 320 may switch a screen to display the chatroom in a 3D form in response to recognizing the screen switch event. Referring to FIG. 5, in response to recognizing a screen switch event in a chatroom 510 displayed in a 2D form, the screen switcher 320 may switch the chatroom 510 to a 3D space 520 having desired depth information. Here, the screen switcher 320 may adjust a depth of the 3D space 520 in response to an input of a desired (or alternatively, predetermined) gesture after the chatroom 510 is switched to a 3D form, that is, after the chatroom 510 is displayed in the 3D form. For example, referring to FIG. 6, the screen switcher 320 may adjust a depth of the 3D space 520 through a spread gesture 601 and/or a pinch gesture 602 using two fingers.

Referring again to FIG. 4, in operation S440, the information outputter 330 may output state information associated with the user of the electronic device 110 and state information associated with a chat partner included in the chatroom on the 3D space. Here, the state information may include profile information registered to the messenger. In addition to basic information such as a profile, the state information may further include a new message, a message non-confirmation state, location information or activity information based on the location information, and/or a use status of another service linked to a messenger account. The messenger may include a function of sending and receiving messages through a chatroom, a function of sharing location information or activity information between a user and a chat partner, a function of providing another service (e.g., a music service) to a messenger account, or the like. For example, the information outputter 330 may represent a distance between the user of the electronic device 110 and a corresponding chat partner as depth information on the 3D space based on location information of the electronic device 110 and location information of the chat partner included in the chatroom. As another example, the information outputter 330 may output, on the 3D space, activity information representing a moving state (e.g., moving by walking, moving in a public transportation (e.g., a bus or a subway), or moving in his/her own vehicle). As another example, the information outputter 330 may output a new message received from a chat partner included in a chatroom or a message non-confirmation state on a 3D space. As another example, the information outputter 330 may output an icon representing another service being used for each chat partner included in a chatroom on a 3D space. For example, if a music service is in use, the information outputter 330 may output a corresponding service icon on a 3D space of a chatroom for each chat partner. Here, the information outputter 330 may track a gaze of the user of the electronic device 110 with respect to the 3D space, and may output content being used by a chat partner corresponding to the gaze of the user through an output device (e.g., a speaker and a display) of the electronic device 110.

FIGS. 7 to 13 illustrate examples of a process of displaying state information on a 3D space of a chatroom according to at least one example embodiment.

Hereinafter, description is made by using a chatroom joined by the user of the electronic device 110 and chat partners A, B, C, and D.

Figure 7:
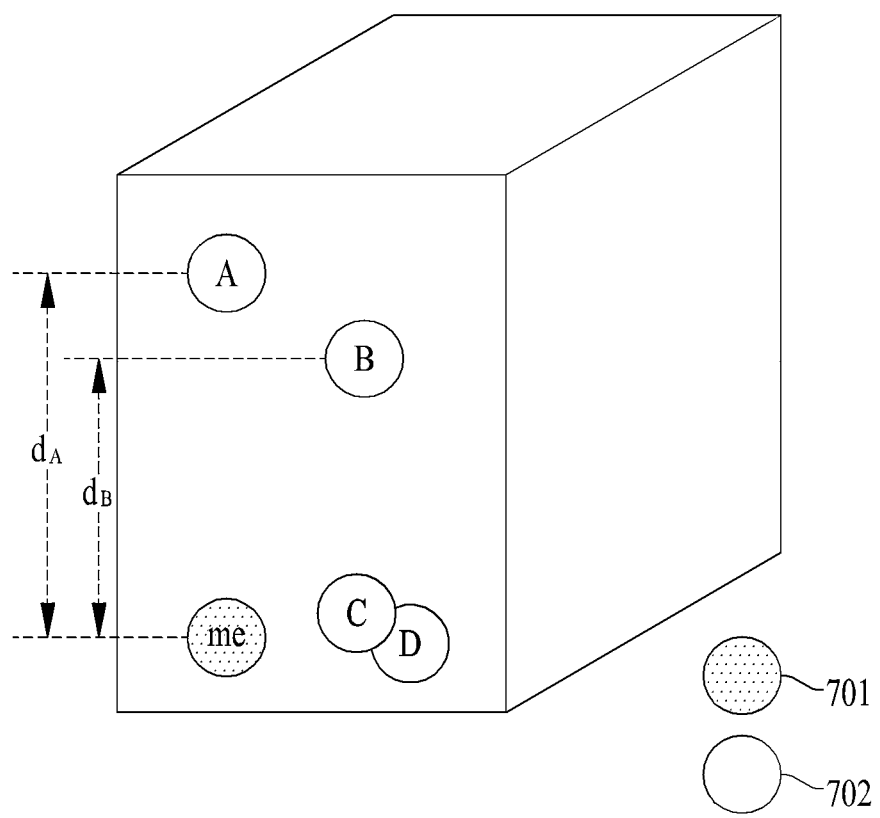
FIGS. 7 to 13 illustrate examples of a process of displaying state information on a 3D space of a chatroom according to at least one example embodiment.

Referring to FIG. 7, the information outputter 330 may display a user icon 701 representing the user and a partner icon 702 representing each chat partner on a 3D space 520 having depth information, as the chatroom. Here, the user icon 701 and the partner icon 702 may include a desired (or alternatively, preset) profile image or default image. In the case of the chat partners A and B each of which a location is allowed to be shared with the user, a distance between the user and each of the chat partners A and B may be represented as depth information $d_A$ and $d_B$ between the user icon 701 and the corresponding partner icon 702. In the case of the chat partners C and D each of which a location is disallowed to be shared with the user, the corresponding partner icons 702 may be displayed around the user icon 701 without depth information. As another example, if orientations or azimuths of the chat partners A and B with respect to the user are verifiable from the location information of the chat partners A and B, the information outputter 330 may display the user icon 701 at the center of the 3D space 520 and may arrange the partner icons 702 based on the orientations or the azimuths of the chat partners A and B verified with respect to the user. As another example, if a video call, for example, a VoIP call between chatroom users starts and a screen is switched to display a chatroom in a 3D form, the information outputter 330 may provide a video call screen using the 3D space 520. Here, the user icon 701 and the partner icons 702 may be configured as a video call screen instead of each profile image.

Figure 8:
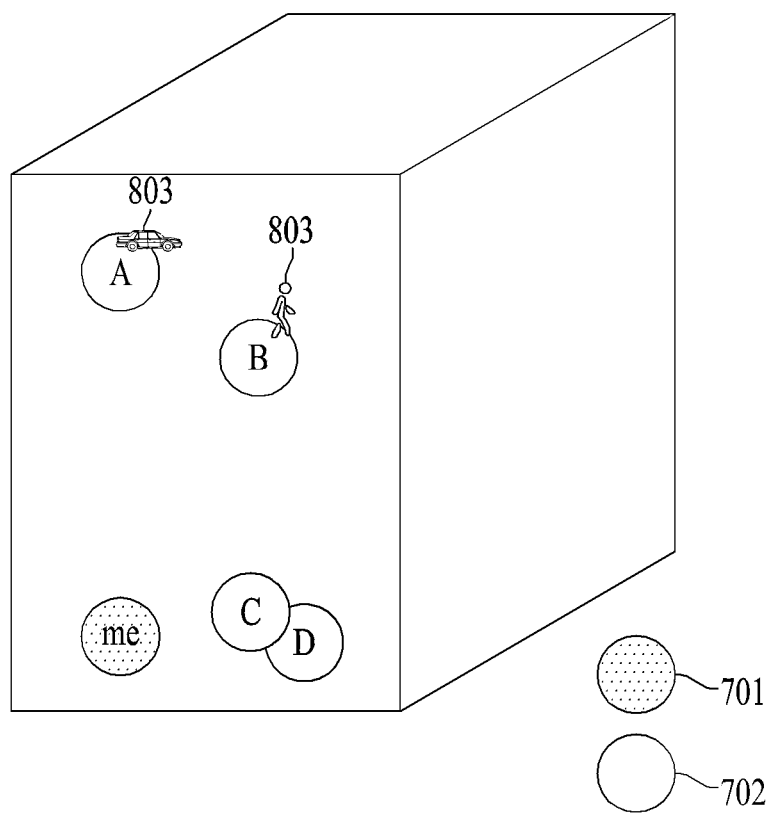

Referring to FIG. 8, in response to detecting movements of the chat partners A and B each of which a location is allowed to be shared with the user, the information outputter 330 may display each moving state icon 803 at a location adjacent to the corresponding partner icon 702, for example, at a right upper end of the partner icon 702. Here, a moving type, for example, moving by walking, moving in a public transportation (e.g., a bus or a subway), moving in his/her own vehicle, may be classified based on a moving speed or a moving route of a chat partner. Also, the information outputter 330 may display the moving state icon 803 corresponding to the classified moving type. The moving speed or the moving route of the chat partner may be information received from an electronic device (e.g., the electronic device 120) of the chat partner, and may be information calculated by the electronic device 110 of the user from location information of the chat partner received from the chat partner.

Figure 9:
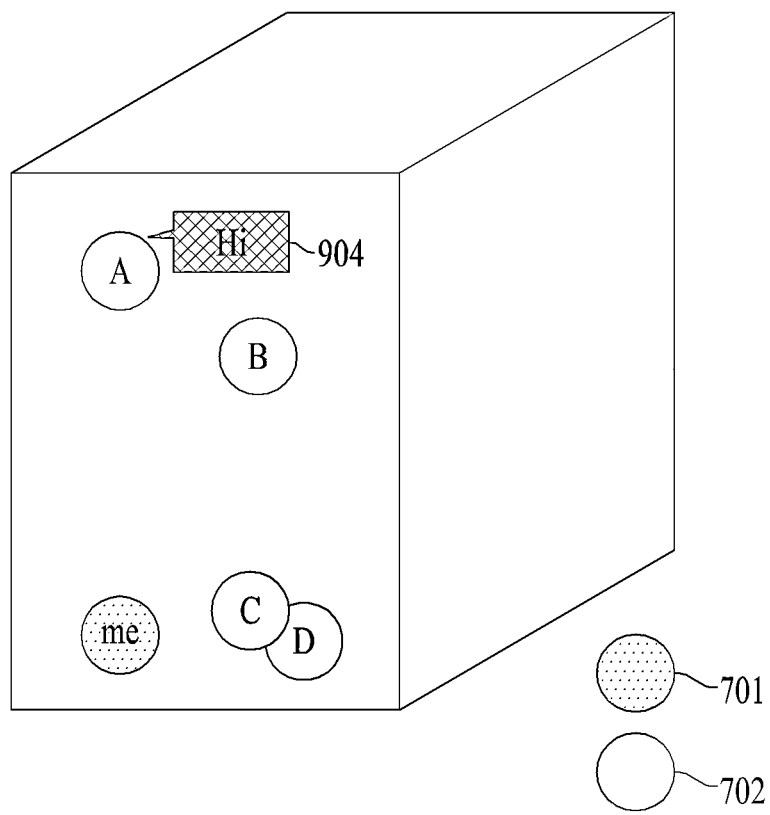
Figure 10:
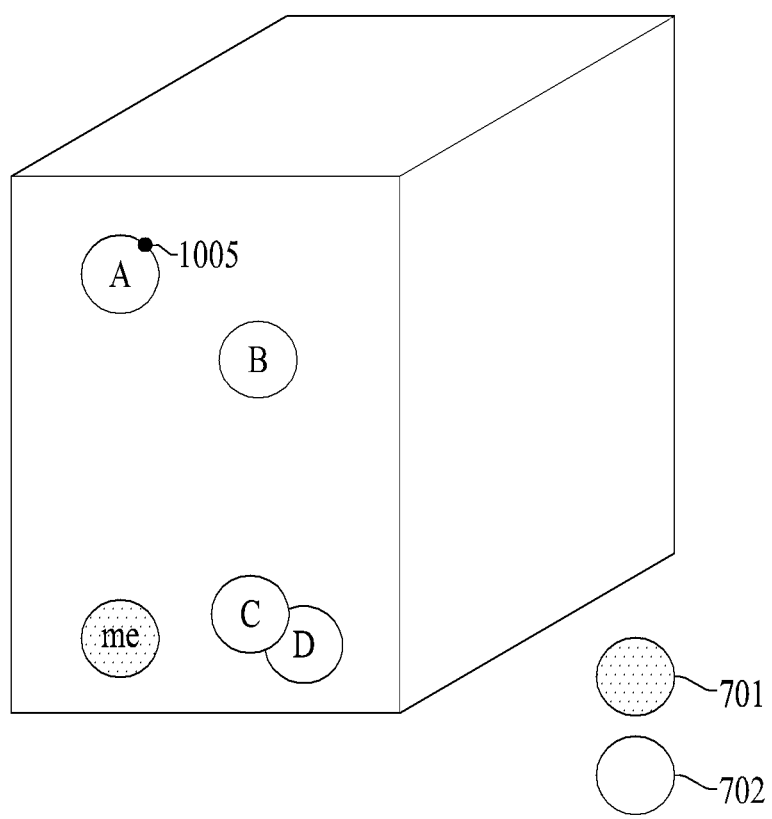

Referring to FIG. 9, in response to receiving a new message from the chat partner A through a chatroom, the information outputter 330 may display a speech balloon 904 for a desired (or alternatively, predetermined) period of time (e.g., 3 seconds) at a location adjacent to the corresponding partner icon 702, for example, at a right upper end of the partner icon 702. Here, if the user taps the speech balloon 904 for the desired (or alternatively, predetermined) period of time, the speech balloon 904 may be processed to be confirmed. If the desired (or alternatively, predetermined) period of time is elapsed without tapping the speech balloon 904, the speech balloon 904 may be processed as a non-confirmed message.

If a desired (or alternatively, predetermined) period of time is elapsed after receiving the new message, the information outputter 330 may remove the speech balloon 904 and may process the corresponding message as a non-confirmed message. In this case, referring to FIG. 10, the information outputter 330 may display an identifier 1005 representing presence of the non-confirmed message at a location adjacent to the partner icon 702 having sent the corresponding message, for example, at a right upper end of the partner icon 702.

Figure 11:
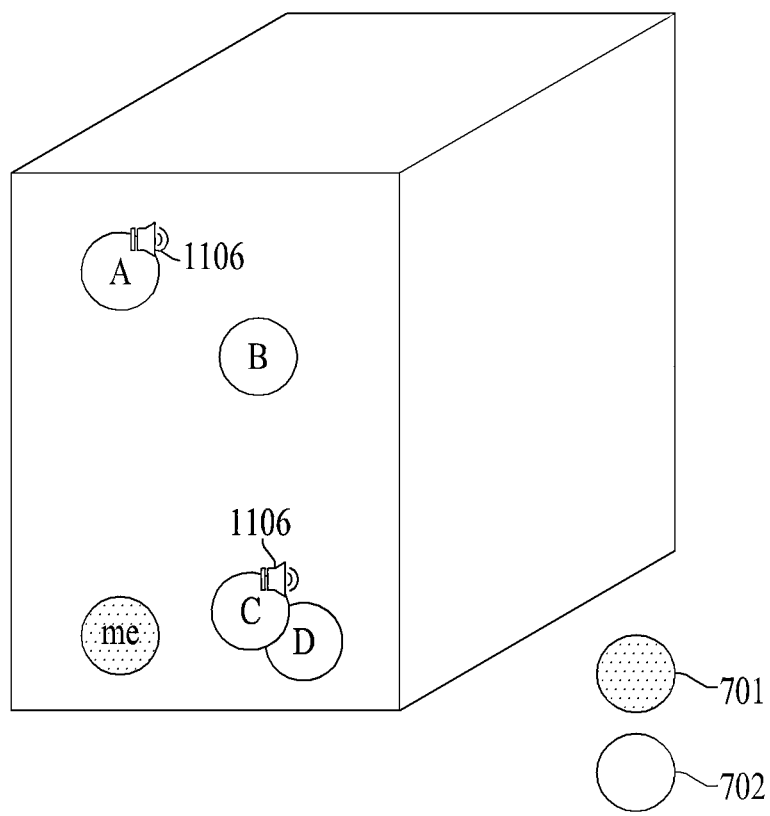

Referring to FIG. 11, if at least a portion of chat partners included in a chatroom is using a music service, the information outputter 330 may output, on the 3D space 520, a service icon 1106 representing the music service at a location adjacent to the partner icon 702, for example, at a right upper end of the partner icon 702.

Figure 12:
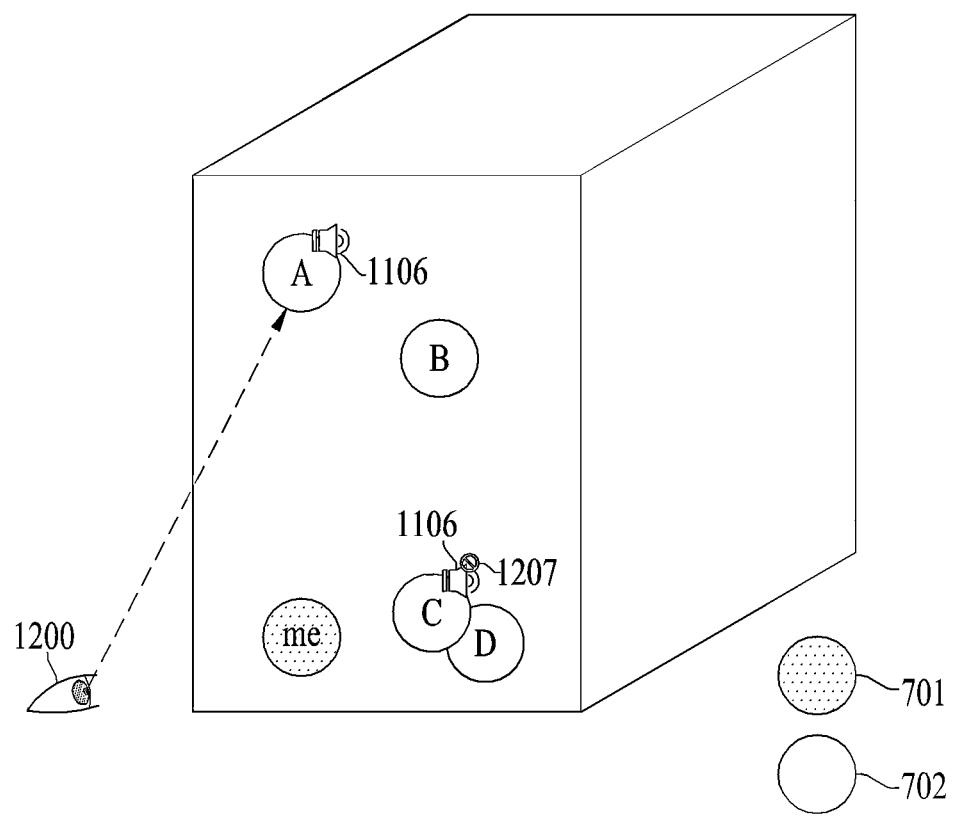
Figure 13:
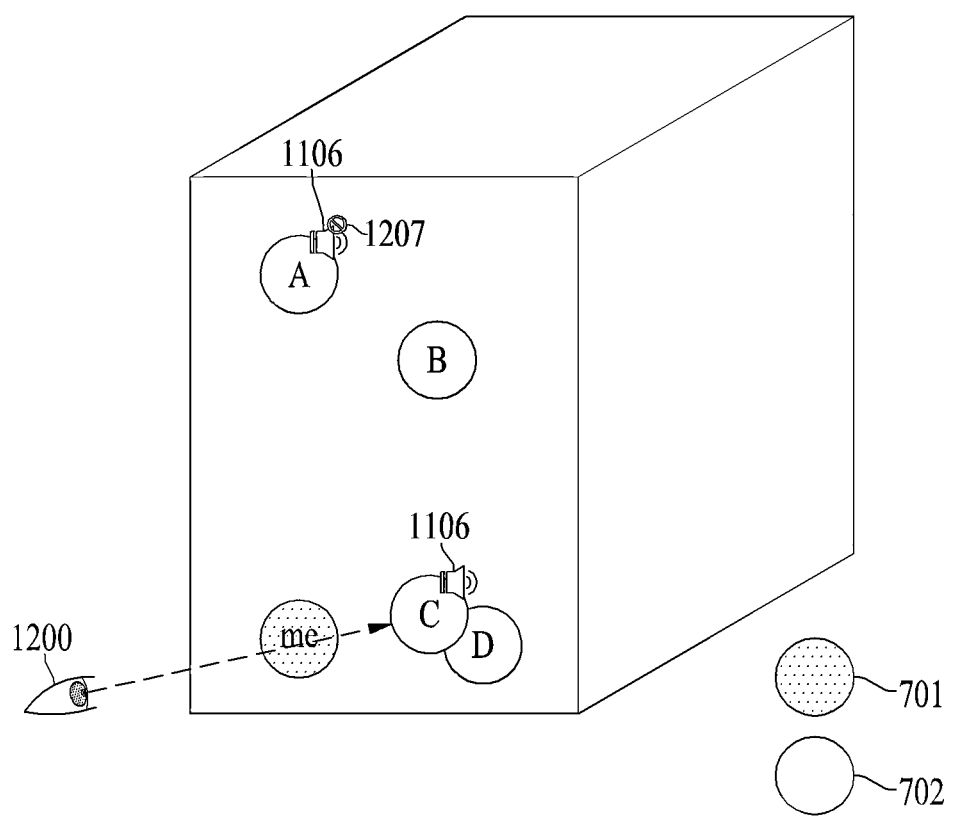

Referring to FIG. 12, the information outputter 330 may track a gaze 1200 of the user with respect to the 3D space 520, and may output music being used by a chat partner corresponding to the gaze 1200 of the user through an output device of the electronic device 110. Referring to FIG. 12, when the chat partners A and C are using a music service, the information outputter 330 may output music the chat partner A is listening to if the gaze 1200 of the user stays at the partner icon 702 of the chat partner A. Here, the information outputter 330 may display a mute icon 1207 at a location adjacent to the partner icon 702 of the chat partner C or the service icon 1106. Referring to FIG. 13, the information outputter 330 may track the gaze 1200 of the user. Here, if the gaze 1200 of the user stays at the partner icon 702 of the chat partner A and then moves to the partner icon 702 of the chat partner C, the information outputter 330 may stop outputting music the chat partner A is listening to, and may output music the chat partner C is listening to. Here, the information outputter 330 may apply the effect of gradually decreasing the volume of music the chat partner A is listening to and gradually increasing the volume of music the chat partner B is listening to. If outputting music the chat partner A is listening to is stopped, the information outputter 330 may display the mute icon 1207 at a location adjacent to the partner icon 702 of the chat partner A or the service icon 1106.

In the case of an icon representing another service being used by a chat partner, the information outputter 330 may output the icon on the chatroom represented in a 2D form as well as a 3D space. For example, the information outputter 330 may sort partner icons configured as profile images in order in which messages are received and may display the sorted partner icons on a 2D chatroom. Here, if a chat partner is using the music service, the information outputter 330 may display a service icon at a location adjacent to a corresponding partner icon and may track a gaze of the user and may output music being used by a chat partner corresponding to the gaze of the user through an output device of the electronic device 110.

According to some example embodiments, it is possible to represent a chatroom as a depth-adjustable 3D mode using 3D technology, and to represent a distance from a chat partner as depth information on a 3D space. Also, it is possible to output, as state information associated with a chat partner on the 3D space, a new message, a message non-confirmation state, location information or activity information based on the location information, and/or a use status of another service linked to a messenger account. Also, it is possible to track a gaze of a user with respect to a chatroom and to output state information of a chat partner corresponding to the gaze of the user.

According to some example embodiments, it is possible to reduce usage of memory and at least one processor included in an electronic device of a user because, for example, a distance from a chat partner or a status information associated with the chat partner are intuitively and instantly represented on a 3D space without additional processing or additional communications between users.

The systems or apparatuses described above may be implemented using hardware components, and/or a combination hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular. However, one skilled in the art will be appreciated that a processing device may include multiple processing elements and/or multiple types of processing elements. For example, a processing device may include multiple processors or a processor and a controller. In addition, different processing configurations are possible, such as parallel processors, distributed processors, a cloud computing configuration, etc. Moreover, each processor of the at least one processor may be a multi-core processor, but the example embodiments are not limited thereto.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The media may continuously store a program executable by a computer or may temporarily store or the program for execution or download. Also, the media may be various types of recording devices or storage devices in which a single piece or a plurality of pieces of hardware may be distributed over a network without being limited to a medium directly connected to a computer system. Examples of the media may include magnetic media such as hard disks, floppy disks, and magnetic tapes; optical media such as CD-ROM discs and DVDs, magneto-optical media such as floptical disks, and hardware devices (e.g., read-only memory (ROM), random access memory (RAM), or flash memory) that are specially configured to store and perform program instructions. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A chatroom display method implemented by a first electronic device comprising at least one processor configured to execute computer-readable instructions included in a memory, the method comprising:

recognizing, by the at least one processor, a screen switch event from a chatroom-related screen displayed on the first electronic device, the chatroom-related screen being associated with a chatroom including a user of the first electronic device;

switching, by the at least one processor, the chatroom-related screen to a screen on which at least one partner icon of at least one chat partner included in the chatroom is provided in response to the screen switch event; and representing, by the at least one processor, the partner icon based on location information of the first electronic device and location information of the at least one chat partner, wherein the representing comprises displaying a moving state icon at a location adjacent to the partner icon based on a moving speed or a moving route according to the location information of the chat partner, wherein the representing further comprises displaying another icon representing a status of a second electronic device of the chat partner at the location adjacent to the partner icon, wherein the another icon is a service icon representing another service being used by the chat partner on the second electronic device at the location adjacent to the partner icon, and wherein the chatroom display method further comprises in response to a request of the first electronic device of the user, playing, on the first electronic device of the user, content of the another service being played on the second electronic device.

2. The method of claim 1, wherein the representing comprises representing the partner icon of the chat partner of which a location of the chat partner has been allowed to be shared.

3. The method of claim 1, wherein the representing comprises displaying information on a new message at the location adjacent to the partner icon in response to the new message received from the chat partner.

4. The method of claim 1, wherein the representing comprises displaying an identifier indicating a non-confirmed message at the location adjacent to the partner icon in response to a new message received from the chat partner being processed as the non-confirmed message.

5. The method of claim 1, wherein the moving state icon includes an icon representing a transportation method being used by the chat partner that is determined based on the moving speed or the moving route according to the location information of the chat partner.

6. The method of claim 1, further comprising:
acquiring the moving speed or the moving route of the chat partner by receiving the moving speed or the moving route of the chat partner from the second electronic device of the chat partner or by calculating the moving speed or the moving route of the chat partner from the location information of the chat partner.

7. The method of claim 1, wherein the displaying the another icon comprises
in response that the content of the another service being played on the first electronic device of the user, displaying the service icon with a first indicator at the location adjacent to the partner icon, and
in response that the content of the another service being not played on the first electronic device of the user, displaying the service icon with a second indicator at the location adjacent to the partner icon.

8. A chatroom display system configured in a first electronic device, the chatroom display system comprising:
a memory; and
at least one processor configured to connect to the memory and to execute computer-readable instructions included in the memory such that the at least one processor is configured to,
recognize a screen switch event from a chatroom-related screen displayed on the first electronic device, the chatroom-related screen being associated with a chatroom including a user of the first electronic device,
switch the chatroom-related screen to a screen on which at least one partner icon of at least one chat partner included in the chatroom is provided in response to the screen switch event,
represent the partner icon based on location information of the first electronic device and location information of the at least one chat partner, and
display a moving state icon at a location adjacent to the partner icon based on a moving speed or a moving route according to the location information of the chat partner,
wherein the at least one processor is further configured to display another icon representing a status of a second electronic device of the chat partner at the location adjacent to the partner icon,
wherein the another icon is a service icon representing another service being used by the chat partner on the second electronic device at the location adjacent to the partner icon, and
wherein the at least one processor is further configured to, in response to a request of the first electronic device of the user, play, on the first electronic device of the user, content of the another service being played on the second electronic device.

9. The chatroom display system of claim 8, wherein the at least one processor is further configured to represent the partner icon of the chat partner of which a location of the chat partner has been allowed to be shared.

10. The chatroom display system of claim 8, wherein the at least one processor is further configured to display information on a new message at the location adjacent to the partner icon in response to the new message received from the chat partner.

11. The chatroom display system of claim 8, wherein the at least one processor is further configured to display an identifier indicating a non-confirmed message at the location adjacent to the partner icon in response to a new message received from the chat partner being processed as the non-confirmed message.

12. The chatroom display system of claim 8, wherein the moving state icon includes an icon representing a transportation method being used by the chat partner that is determined based on the moving speed or the moving route according to the location information of the chat partner.

13. The chatroom display system of claim 8, wherein the at least one processor is further configured to acquire the moving speed or the moving route of the chat partner by receiving the moving speed or the moving route of the chat partner from the second electronic device of the chat partner or by calculating the moving speed or the moving route of the chat partner from the location information of the chat partner.

14. The chatroom display system of claim 8, wherein the at least one processor is configured to
in response that the content of the another service being played on the first electronic device of the user, display the service icon with a first indicator at the location adjacent to the partner icon, and
in response that the content of the another service being not played on the first electronic device of the user, display the service icon with a second indicator at the location adjacent to the partner icon.

15. A non-transitory computer-readable record medium storing instructions that, when executed by at least one processor, cause an electronic device to perform the chatroom display method of claim 1.

* * * * *